(12) United States Patent
Hirata

(10) Patent No.: US 8,313,284 B2
(45) Date of Patent: Nov. 20, 2012

(54) CENTRIFUGAL FAN DEVICE AND ELETRONIC DEVICE HAVING THE SAME

(75) Inventor: Masahiko Hirata, Oita (JP)

(73) Assignee: Panasonic Corporation, Osaka (JP)

( * ) Notice: Subject to any disclaimer, the term of this patent is extended or adjusted under 35 U.S.C. 154(b) by 1520 days.

(21) Appl. No.: 11/780,030

(22) Filed: Jul. 19, 2007

(65) Prior Publication Data

US 2008/0019827 A1    Jan. 24, 2008

(30) Foreign Application Priority Data

Jul. 21, 2006 (JP) .................................. 2006-198970
Apr. 27, 2007 (JP) .................................. 2007-118691
May 31, 2007 (JP) .................................. 2007-144797

(51) Int. Cl.
*F04D 29/44* (2006.01)
*F04D 29/66* (2006.01)

(52) U.S. Cl. ....................... 415/119; 415/206; 415/211.2

(58) Field of Classification Search ................... 415/119, 415/206, 211.2
See application file for complete search history.

(56) References Cited

U.S. PATENT DOCUMENTS

| | | | | |
|---|---|---|---|---|
| 3,687,360 A * | 8/1972 | Prew et al. | ...................... | 494/85 |
| 4,159,073 A * | 6/1979 | Liller | ........................... | 228/125 |
| 5,676,523 A * | 10/1997 | Lee | ............................. | 415/206 |
| 5,813,831 A * | 9/1998 | Matsunaga et al. | .......... | 415/173.6 |
| 5,839,879 A * | 11/1998 | Kameoka et al. | ............ | 415/206 |
| 5,997,246 A * | 12/1999 | Humbad | ...................... | 415/119 |
| 6,162,016 A * | 12/2000 | Humbad | ...................... | 415/204 |
| 6,575,696 B1 * | 6/2003 | Lyons et al. | ................. | 415/119 |
| 6,778,390 B2 * | 8/2004 | Michael | ........................ | 361/695 |
| 6,871,702 B2 * | 3/2005 | Horng et al. | ................ | 165/104.33 |
| 7,063,510 B2 * | 6/2006 | Takeshita et al. | ......... | 416/210 R |
| 7,179,050 B2 * | 2/2007 | Hopfensperger | ............ | 415/204 |
| 7,237,599 B2 * | 7/2007 | Lopatinsky et al. | ........ | 165/80.3 |
| 7,255,532 B2 * | 8/2007 | Zheng | .......................... | 415/183 |
| 7,284,952 B2 * | 10/2007 | Huang et al. | ................. | 415/119 |
| 7,607,886 B2 * | 10/2009 | Hsu et al. | ..................... | 415/206 |
| 2006/0078423 A1 * | 4/2006 | Zheng | .......................... | 415/206 |
| 2006/0099071 A1 * | 5/2006 | Kao et al. | ..................... | 415/206 |
| 2007/0128052 A1 * | 6/2007 | Moriya et al. | ................ | 417/354 |

FOREIGN PATENT DOCUMENTS

| | | |
|---|---|---|
| JP | 2003336600 | 11/2003 |
| JP | 2004278473 | 10/2004 |
| JP | 2005-069610 | 3/2005 |
| JP | 2006-114608 | 4/2006 |
| JP | 2007126976 A * | 5/2007 |

OTHER PUBLICATIONS

Japanese Office Action dated Oct. 19, 2010.

* cited by examiner

*Primary Examiner* — Edward Look
*Assistant Examiner* — Sean J Younger
(74) *Attorney, Agent, or Firm* — Dickinson Wright PLLC

(57) ABSTRACT

A centrifugal fan device includes a diverting member the height of which is lower than the height of an interior wall surface of a casing. The diverting member diverts the air flowing to an air outlet into a centrifugal fan side and a side wall side of the diverting member and also diverts the air flowing to the air outlet into a first cover side and a second cover side of the diverting member. As a result, the amount of air blown from the air outlet is dispersed uniformly over the entire area of the air outlet, and a deviation in the amount of air blown out of the air outlet is reduced.

6 Claims, 12 Drawing Sheets

CENTRIFUGAL FAN DEVICE AND ELETRONIC DEVICE HAVING THE SAME

BACKGROUND

The present invention relates to a centrifugal fan device used for cooling a heating element, such as a microprocessor unit (hereinafter called an "MPU") mounted in a housing of an electronic device, as well as to an electronic device having the fan.

Movement toward speedup of data processing in a recent computer is considerably rapid, and the clock frequency of an MPU is markedly higher than ever.

Consequently, the amount of heat emitted by the MPU is increased, and there are required a method for directly cooling a heat sink by means of a fan and a method for forcefully cooling a radiator; namely, a heat sink module formed by thermally connecting a heat-receiving element to a heat-radiating element by use of a heat pipe, as well as a method for bringing a heat sink having a radiator fin into contact with a heating element, to thus dissipate heat, as in the related art. It is also indispensable to forcefully circulate a liquid coolant exhibiting high thermal conductivity by means of a pump and forcefully blow air on the heating element by means of a centrifugal fan device. Further enhancement of cooling performance of the fan and an additional reduction in size and thickness of the fan are required.

Enhancement of cooling performance of the centrifugal fan device is greatly dependent on an improvement in air-blasting performance of the fan, such as increased air quantity, increased static pressure, or other factors. In addition, even when air is blown uniformly over a wide range at an air outlet of the fan, heat is efficiently exchanged with; e.g., a radiator fin disposed at the air outlet, and hence the cooling performance of the fan can be enhanced greatly.

FIG. 10A is a side view showing the inside of a casing of a centrifugal fan device of the related art, and FIG. 10B is a partial cutaway view of the casing of the fan device of the related art.

A centrifugal fan device 101 is equipped with a sirrocco fan 103 disposed in a helical casing 102, and a motor 14 for rotating the sirrocco fan 103 is provided on one face of the casing 102. An air inlet 105 is formed in a face of the casing opposite the face provided with the motor.

The helical casing 102 is formed from sidewalls 121 and 122, which are parallel to each other, and an outer peripheral wall 123. An airway 106 for wind resulting from rotation of the sirrocco fan 103 is created in the casing 102, and the outlet 107 is opened in the end of the airway 106.

In the centrifugal fan device 101, an outer peripheral wall 123a of the casing 102 continuous from the casing nose section 109 parallel to a rotary shaft 108 of the sirrocco fan 103 is formed so as to spread toward the outlet 107. There is provided an outlet portion 107a which opens widely at the end of the casing 102 by means of widening end sections 121a and 122a of both sidewalls in association of the spread of the outer peripheral wall. The position and angle (A) of the nose are changed downwardly when compared with the position and angle of a related-art nose, to thus move the casing nose section 109 and make an opening area wider. The wide outlet 107 having a straight section 110 is opened at the leading end of the casing nose section.

A partition board 111 is provided between the sidewalls 121 and 122 of the casing 102 from the airway 106 to the wide outlet 107.

The centrifugal fan device 101 rotates the sirrocco fan 103 by means of rotation of the motor 104, thereby transforming the air taken in through the air inlet 105 into a swirling wind and causing the thus-swirled wind to pass through the airway 106 and to exit from the wide outlet 107 opened at the end of the casing 102.

The partition plate 111 of the centrifugal fan device 101 is disposed so as to divert the wind delivered from the airway 106 into essentially-equal parts. The wind is diverted, in an essentially-equal manner, between an airway 112 on the nose side and an airway 113 on a side counter to the nose side. The thus-diverted winds are guided so as to spread as they approach the wide outlet 107 and can flow out of the entire exit of the wide outlet 107 in an essentially-uniform manner.

The centrifugal fan device 101 guides the wind by means of splitting the airway of the widely-enlarged outlet section into the nose-side airway and the counter-noise-side airway in an essentially-uniform manner, and the wind uniformly flows out of the entirety of the wide outlet 107. Hence, a decrease in air-blasting performance, which would otherwise arise in such a related-art centrifugal fan device not having the partition plate 111, can be prevented.

Consequently, the centrifugal fan device 101 is effective for blowing an air over or cooling a wide range, such as for the purpose of cooling batteries of an electric vehicle equipped with a large number of batteries; for instance, a hybrid car.

The partition plate 111 is provided at a position different from the previously-described position or provided at a different angle of inclination, whereby the direction of or the amount of an air flowing out of the wide outlet 107 can also be changed (Patent Document 1).

In another related art, though unillustrated, an air blower using a cross flow fan is available. There has also been proposed an air blower in which one airway partition plate or a plurality of airway partition plates are provided in an airway close to an air outlet for splitting the airway into airways; the flow of an air becomes stable within the airways by virtue of the partition plates; and occurrence of an air stripping phenomenon is prevented, thereby diminishing noise attributable to stripping sound (Patent Document 2).

[Patent Document 1] JP-A-2003-336600 (FIGS. 1 and 2 on page. 5)

[Patent Document 2] JP-A-2004-278473 (FIGS. 1 and 3 on page 8)

However, in the related-art centrifugal fan device 101 such as that mentioned above, the partition plate 111 assumes a mere plate-like shape, and the partition plate 111 is formed over the entire height of the airway 106. Hence, the centrifugal fan device suffers a problem of, among the airs diverted into the airways 112 and 113 in an essentially-equal manner, particularly the air diverted into the airway 113 encountering difficulty in smoothly flowing up to the wide outlet 107.

Specifically, the flowing direction of the air is forcefully changed so as to spread toward the nose-side airway 112 while the air blown by the sirrocco fan 103 is incessantly colliding against a portion of the face of the partition 111 facing the sirrocco fan 103.

However, the air is difficult to flow in the vicinity of a face located at a position opposite the face facing the sirrocco fan 103 of the partition plate 111, and the speed of the air located in the vicinity of the opposite face is decelerated greatly. Thus, a pressure difference has become ease to arise between the air located in the vicinity of the opposite face and the air flowing in the vicinity of the outer peripheral wall 123 of the airway 113.

Consequently, the partition plate 111 entirely acts as great resistance to the airway and also as a factor for generating an eddy current or air turbulence on the side opposite the face of the partition plate facing the sirrocco fan 103. Hence, when compared with the air flowing out of the related-art centrifugal fan device, an air can be discharged uniformly from the wide outlet 107. However, there still exists a problem of difficulty being encountered in increasing the overall amount of air blast over a wide range at the air outlet as a result of the air partially failing to smoothly flow as mentioned previously.

The air blower using the related-art cross flow fan, such as that mentioned previously, is enhanced in terms of stability of an air blow, thereby achieving reduced noise. However, the air blower encounters difficulty in uniformly blowing an air over a wide range at the air outlet.

SUMMARY

The present invention solves the problems of the related art, such as those mentioned previously, and aims at providing a centrifugal fan device which can uniformly blow an air over a wide range at an air outlet and achieve an increase in the amount of air blast.

In order to solve the problems of the related art, a centrifugal fan device of the present invention comprises a centrifugal fan that has a plurality of blades. The centrifugal fan blows an air in a centrifugal direction by rotation of the plurality of the blades. The centrifugal fan device includes a casing that houses the centrifugal fan. The casing includes a sidewall. The side wall has an air outlet along an outer periphery of the centrifugal fan. The casing also has a first cover and a second cover. The first cover and the second cover are provided parallel to the centrifugal fan. The first cover and the second cover cover the centrifugal fan. Each of the first cover and the second cover has an air inlet for taking the air in the centrifugal fan. Further, the centrifugal fan device includes a diverting member that stands upright on an interior surface of one of the first cover and the second cover. The diverting member extends from side wall to the air outlet, and a height of the diverting member is lower than a height of a sidewall surface of the sidewall.

By the above configuration, the amount of an air blown out of the air outlet can be dispersed uniformly over the entire area of the air outlet, and thus the amount of the air blown out of the air outlet can be increased.

DETAILED DESCRIPTION

First Embodiment

Figure 1:
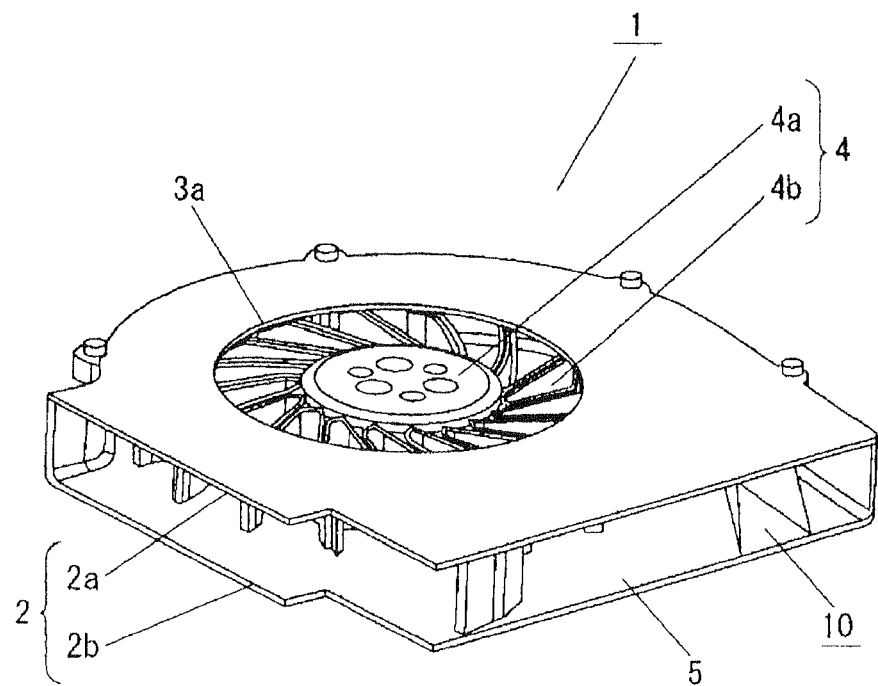
FIG. 1 is a perspective view of a centrifugal fan device according to a first embodiment of the present invention.
Figure 2:
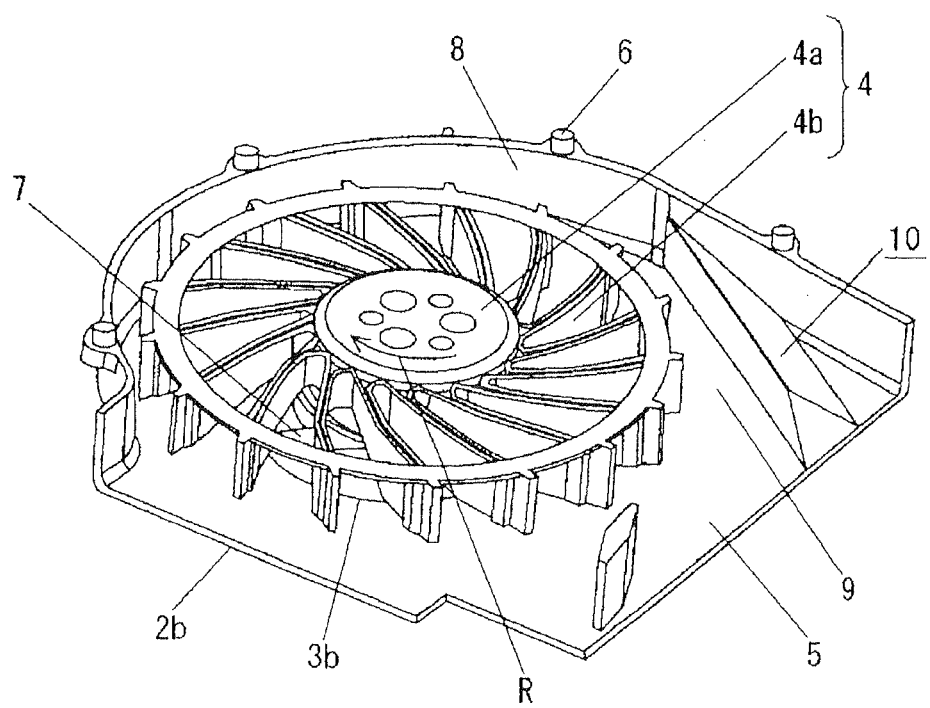
FIG. 2 is a perspective view of the centrifugal fan device of the first embodiment acquired when a fan cover of the centrifugal fan device is removed.
Figure 3A:
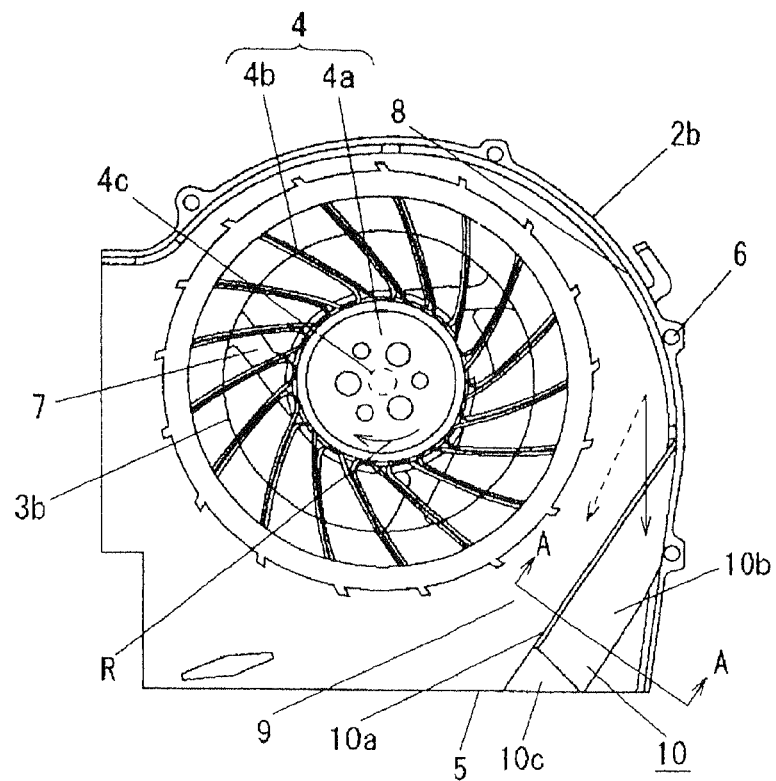
FIG. 3A is a plan view of the centrifugal fan device of the first embodiment of the present invention achieved when the fan cover is removed.
Figure 3B:
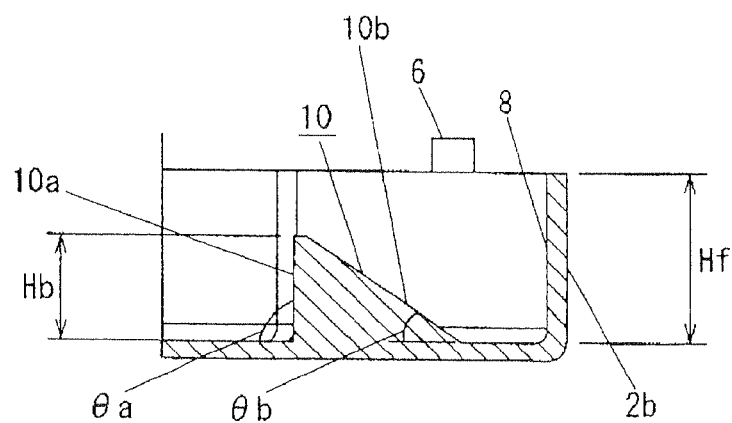
FIG. 3B is a cross-sectional view taken along line A-A shown in FIG. 3A.
Figure 4:
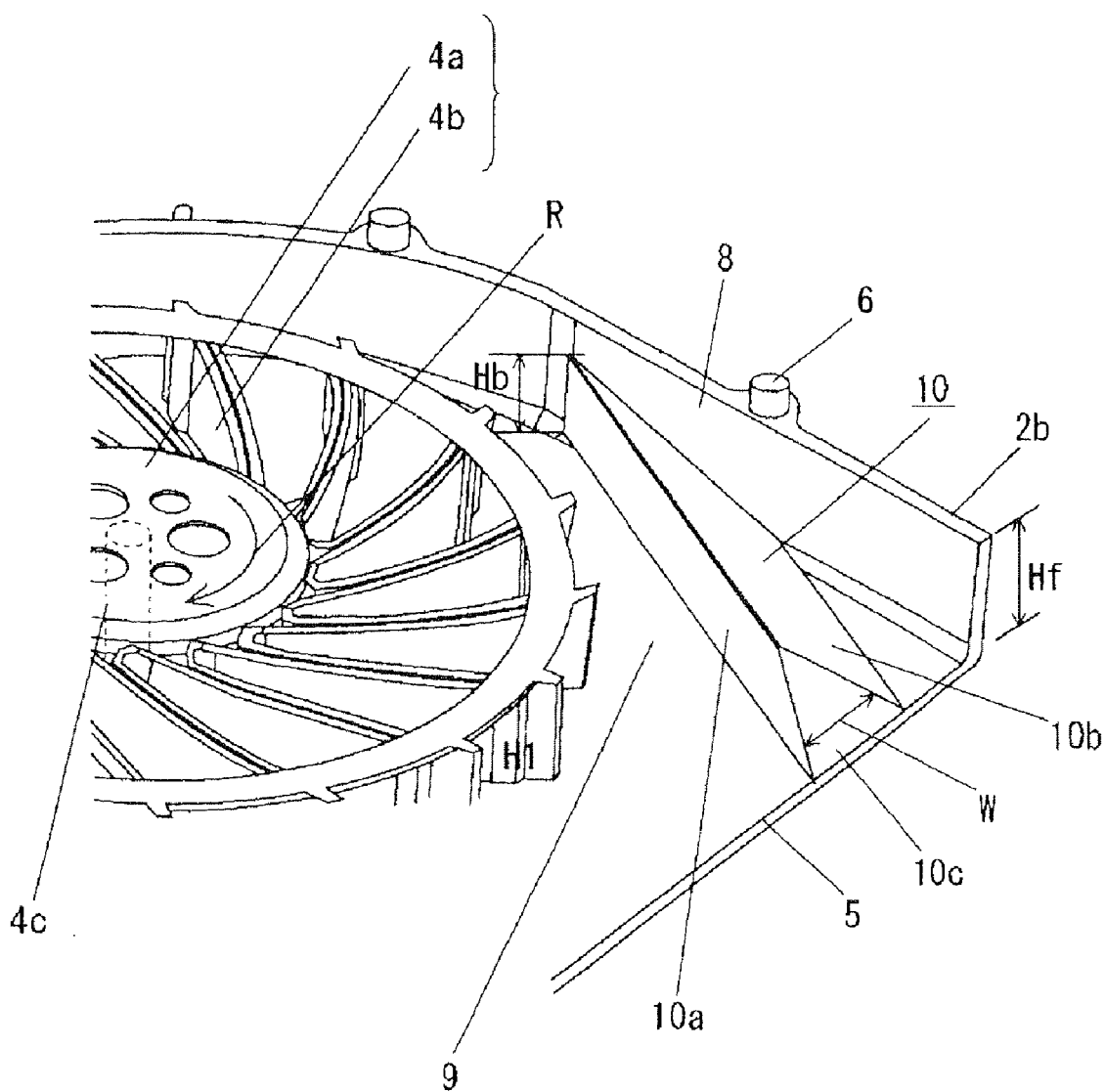
FIG. 4 is a partial enlarged perspective view of the centrifugal fan device of the first embodiment of the present invention.
Figure 5A:
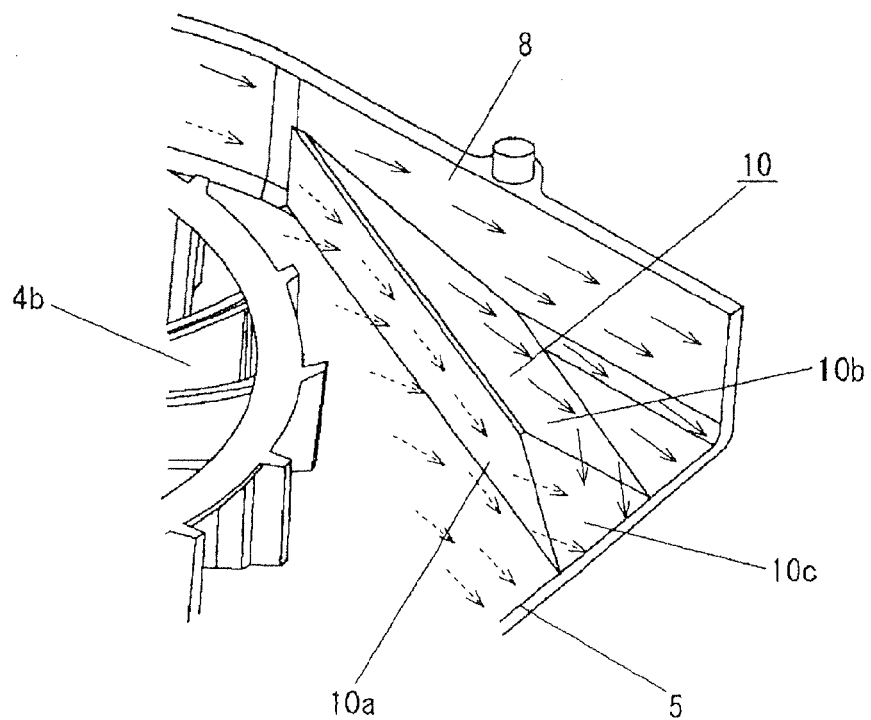
FIG. 5A is a partial enlarged perspective view showing the flow of an air achieved in the vicinity of a diverting member in the first embodiment of the present invention.
Figure 5B:
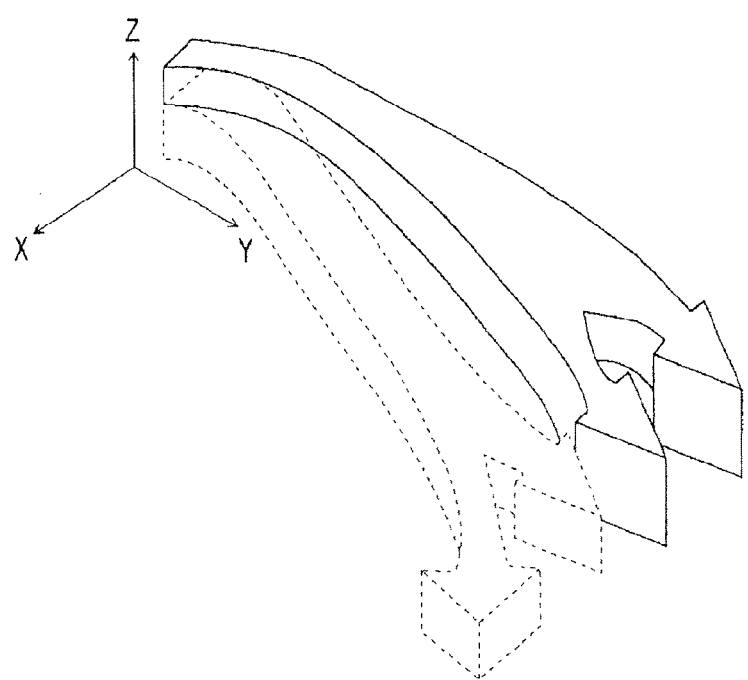
FIG. 5B is a diagrammatic view showing the flow of an air shown in FIG. 5A.

FIG. 1 is a perspective view of a centrifugal fan device according to a first embodiment of the present invention; FIG. 2 is a perspective view of the centrifugal fan device of the first embodiment acquired when a fan cover of the centrifugal fan device is removed; FIG. 3A is a plan view of the centrifugal fan device of the first embodiment of the present invention achieved when the fan cover is removed; FIG. 3B is a cross-sectional view taken along line A-A shown in FIG. 3A; FIG. 4 is a partial enlarged view of the centrifugal fan device of the first embodiment of the present invention; FIG. 5A is a partial enlarged perspective view showing the flow of an air achieved in the vicinity of a diverting member in the first embodiment of the present invention; and FIG. 5B is a diagrammatic view showing the flow of an air shown in FIG. 5A.

First, as shown in FIG. 1, a flat, thin casing 2 of a centrifugal fan device 1 comprises a fan cover 2a located in an upper portion and a fan frame 2b located below the fan cover 2a.

The fan cover 2a is formed into the shape of a plate by means of punching a metallic material such as aluminum, stainless steel, and the like, or by means of resin molding. An essentially-circular air intake 3a is formed in the essentially center of the fan cover for taking in an air from the outside.

The centrifugal fan 4 is disposed in the casing 2 so as to be housed and sandwiched between the fan cover 2a and the fan frame 2b. The centrifugal fan 4 is formed from a hub section 4a having a cylindrical outer peripheral surface and a plurality of blades 4b extending from the outer peripheral surface in an essentially-radial pattern and in a centrifugal direction. As a result of the blades 4b rotating around a rotational center shaft 4c acting as the center of rotation (see FIG. 3A), the air taken in from the air inlet 3a is discharged in the centrifugal direction.

In the fan frame 2b, a bottom and a sidewall are formed integrally by means of resin molding or die-cast molding of an aluminum alloy. An air outlet 5 is formed in the sidewall for issuing the air taken in the casing 2.

Specifically, the casing 2 is formed from the sidewall having the air outlet 5 for issuing the air sideways along the outer periphery of the centrifugal fan 4; and two parallel members; that is, a bottom of the fan cover 2a and a bottom of the fan frame 2b.

As shown in FIG. 2, an essentially-cylindrical projection 6 which is fitted into a mount hole (see FIG. 1) of the fan cover 2a and fixed by means of thermal welding, caulking, or the like, is provided at four positions on top of the sidewall of the fan frame 2b.

An air inlet 3b having essentially the same diameter as that of the previously-described air inlet 3a (see FIG. 1) is formed in the bottom that is a lower portion of the fan frame 2b, and the air inlet 3b takes in an air from the outside.

Spokes 7 for rotationally retaining the centrifugal fan 4 are connected to the periphery of the air inlet 3b of the fan frame 2b so as to transverse the air inlet 3b.

When the centrifugal fan 4 rotates at high speed in the rotational direction designated by arrow R, an air is taken in through both the air inlet 3a formed in the center of the fan cover 2a (see FIG. 1) so as to oppose an upper surface of the hub section 4a and the air inlet 3b placed in the center of the bottom of the fan frame 2b.

The direction of the air thus taken in is changed to the centrifugal direction of the blades 4b within the casing 2 by means of rotational movement of the plurality of blades 4b. Much of the air is delivered to the rotational direction of the centrifugal fan 4 designated by arrow R along the interior wall of the fan cover 2a and the interior wall of the fan frame 2b while colliding against the interior walls. The thus-delivered flows of air are finally discharged from the air outlet 5.

A diverting member 10 is formed integrally on an interior surface of the bottom of the fan frame 2b within an airway 9 located between the sidewall surface 8 of the fan frame 2b located laterally along the outer periphery of the centrifugal fan 4 and the air outlet 5. The diverting member 10 may also be provided separately from the bottom of the fan frame 2b.

The diverting member 10 extends from the sidewall surface 8 of the sidewall of the casing 2 to the air outlet 5, and the height of the diverting member 10 is lower than the height of the sidewall surface 8 of the sidewall of the casing 2.

Therefore, the air flowing to the air outlet 5 is diverted by means of the sidewall surface 8 and the diverting member 10 into two directions: namely, a direction orthogonal to the rotational center shaft 4c of the centrifugal fan 4 (see FIG. 4) and another direction orthogonal to the rotational center shaft 4c of the centrifugal fan 4 (see FIG. 4). Therefore, a deviation in the amount of air blown out of the air outlet 5 can be diminished, so that uniform discharge of an air over a wide range and an increase in the amount of blast can be materialized.

Specifically, the air flowing to the air outlet 5 is diverted into an air flowing toward the air outlet 5 along the diverting member 10 and an air flowing toward the air outlet 5 along the sidewall surface 8 while passing through clearance located above the diverting member 10. Hence, a deviation in the amount of air issued from the air outlet 5 can be diminished, and uniform discharge of an air over a wide range and an increase in the amount of blast can be materialized.

As shown in FIG. 3A, the essentially-cylindrical projection 6 which is fitted into the mount hole (see FIG. 1) of the fan cover 2a and fixed by means of thermal welding, caulking, or the like, is provided at four positions on top of the curved sidewall of the fan frame 2b.

The air inlet 3b having essentially the same diameter as that of the previously-described air inlet 3a (see FIG. 1) is formed in the bottom located below the fan frame 2b, and the air inlet 3b takes in an air from the outside.

The spokes 7 for rotationally retaining the centrifugal fan 4 are connected, at three points, to the periphery of the air inlet 3b of the fan frame 2b so as to transverse the air inlet 3b.

When the centrifugal fan 4 rotates at high speed in the rotational direction designated by arrow R, an air is taken in through both the air inlet 3a formed in the center of the fan cover 2a (see FIG. 1) so as to oppose an upper surface of the hub section 4a and the air inlet 3b placed in the center of the bottom of the fan frame 2b. The direction of the air thus taken in is changed to the centrifugal direction of the blades 4b within the casing 2 by means of rotational movement of the plurality of blades 4b. Much of the air is delivered to the rotational direction of the centrifugal fan 4 designated by arrow R along the interior wall of the fan cover 2a and the interior wall of the fan frame 2b while colliding against the interior walls. The thus-delivered air is diverted by the previously-described diverting member 10 broadly into a direction designated by a solid arrow and a direction designated by a broken arrow. The thus-diverted flows of air are finally discharged from the air outlet 5.

The diverting member 10 stands upright on the interior surface of the bottom of the fan frame 2b in the direction of the rotational center shaft 4c of the centrifugal fan 4 (corresponding to the vertical direction in FIG. 3B) within an airway 9 located between the sidewall surface 8 of the fan frame 2b located laterally along the outer periphery of the centrifugal fan 4 and the air outlet 5.

As shown in FIG. 3B, the diverting member 10 is set to a low height in such a way that the height Hb of the diverting member 10 from the interior surface of the fan frame 2b comes to about 50% to 80% of a height Hf from the interior surface of the fan frame 2b. The air flowing to the air outlet 5 is diverted by means of the sidewall surface 8 and the diverting member 10 into two directions: namely, a direction orthogonal to the rotational center shaft 4c of the centrifugal fan 4 and another direction orthogonal to the rotational center shaft 4c of the centrifugal fan 4. Therefore, a deviation in the amount of air blown out of the air outlet 5 can be diminished, so that uniform discharge of an air over a wide range and an increase in the amount of blast can be materialized.

Specifically, the air flowing to the air outlet 5 is diverted into an air flowing toward the air outlet 5 along the diverting member 10 and an air flowing toward the air outlet 5 along the sidewall surface 8 while passing through clearance (Hf-Hb) located above the diverting member 10. Hence, a deviation in the amount of air issued from the air outlet 5 can be diminished, and uniform discharge of an air over a wide range and an increase in the amount of blast can be materialized.

A first side surface 10a which serves as the surface of the diverting member 10 facing the blades 4b is formed in an essentially-vertical direction in such a way that an angle θa with respect to the fan frame 2b falls within a range from 75° to 105°. The first side surface 10a directly undergoes the air sent from the centrifugal fan 4 and causes the air to flow smoothly to the air outlet 5 along the surface.

A second surface 10b which serves as the surface of the diverting member 10 facing the sidewall surface 8 is inclined with respect to the fan frame 2b such that an angle θb falls within a range from 25° to 65°. The air having passed through the clearance (Hf-Hb) located above the diverting member 10 flows smoothly toward the air outlet 5 along the inclined second surface 10b.

Further detailed explanations are provided by reference to FIG. 4. The diverting member 10 stands upright on the interior surface of the bottom of the fan frame 2b in the direction of the rotational center shaft 4c of the centrifugal fan 4 (corresponding to the vertical direction in FIG. 3B) within the airway 9 located between the sidewall surface 8 of the fan frame 2b located laterally along the outer periphery of the centrifugal fan 4 and the air outlet 5.

In the diverting member 10, the first side surface 10a directly undergoing the air sent from the centrifugal fan 4 is provided so as to stand essentially upright on the fan frame 2b within the range of the angle θa. The height Hb of the diverting member 10 is set so as to become lower than the height Hf of the sidewall surface 8 of the fan frame 2b and to fall within a range from about 50% to 80% of the height Hf.

As mentioned above, the height Hb of the diverting member 10 is set so as to become lower than the height Hf of the sidewall surface 8 of the fan frame 2b of the casing 2. The air flowing to the air outlet 5 is diverted by means of the sidewall surface 8 and the diverting member 10 into two directions: namely, a direction orthogonal to the rotational center shaft 4c of the centrifugal fan 4 (corresponding to a direction parallel to the bottom of the fan frame 2b shown in FIG. 3B) and a direction of the rotational center shaft 4c of the centrifugal fan 4 (corresponding to the vertical direction in FIG. 3B).

Specifically, the air flowing to the air outlet 5 is diverted into an air flowing toward the air outlet 5 along the first side surface 10a while colliding against the first side surface 10a of the diverting member 10 and an air flowing along the sidewall surface 8 while passing through clearance (Hf-Hb) located above the diverting member 10.

Hence, since a deviation in the amount of air issued from the air outlet 5 can be diminished, uniform discharge of an air over a wide range and an increase in the amount of blast can be materialized.

The second side surface 10b serving as the inclined surface of the diverting member 10 facing the sidewall surface 8 causes an air to flow above when the air flowing to the air outlet 5 passes by the side of the diverting member 10. As a result, the resistance to the airway induced by the diverting member 10 becomes smaller, and generation of an eddy current or air turbulence is inhibited, whereby the air flowing upwardly along the inclined second side surface 10b flows smoothly. Hence, a deviation in the amount of air issued from the air outlet 5 can be diminished more thoroughly, uniform discharge of an air over a wide range and an increase in the amount of blast can be materialized.

A third side surface 10c—whose width W becomes greater with a closer approach to the air outlet 5 and which is inclined with respect to the interior surface of the bottom of the fan frame 2b—is provided on the end face of the diverting member 10 that faces the air outlet 5. The air flowing to the air outlet 5 is diverted by means of the sidewall surface 8 and the diverting member 10. The air flow diverted into the direction orthogonal to the rotational center shaft 4c of the centrifugal fan 4 (a direction parallel to the bottom of the fan frame 2b in FIG. 3B) and the air flow diverted into the direction of the rotational center shaft 4c of the centrifugal fan 4 (corresponding to the vertical direction in FIG. 3B) are mixed much as they approach the air outlet 5 along the inclined third side surface 10c. Thereby, the amount of air discharged from the air outlet 5 can be made uniform within the area of the air outlet 5. Consequently, a deviation in the amount of air discharged from the air outlet 5 is reduced further thoroughly, and uniform discharge of an air over a wide range and an increase in the amount of blast can be materialized.

Specifically, the air flowing to the air outlet 5 is diverted into the air flowing toward the air outlet 5 along the diverting member 10 and the air flowing toward the air outlet 5 along the sidewall surface 8 while passing through the clearance located above the diverting member 10. Hence, a deviation in the amount of air issued from the air outlet 5 can be diminished, and uniform discharge of an air over a wide range and an increase in the amount of blast can be materialized.

As mentioned above, the diverting member 10 is extended from the sidewall surface 8 in the vicinity of the air outlet 5 to the air outlet 5, to thus start splitting the air before the air flowing to the air outlet 5 begins to spread and to thus keep consecutively splitting the air until the air passes through the air outlet 5. When passing through the air outlet 5, the air is split thoroughly. Therefore, a deviation in the amount of air issued from the air outlet 5 can be diminished, and uniform discharge of an air over a wide range and an increase in the amount of blast can be materialized.

The state of the air split by the diverting member 10 will now be described in more detail by reference to FIGS. 5A and 5B.

In FIG. 5A, the air flowing toward the center of the air outlet 5 along the first side surface 10a while colliding against the first side surface 10a of the diverting member 10 is designated by a broken arrow, and the air flowing along the sidewall surface 8 while passing through the clearance located above the diverting member 10 is designated by a solid arrow.

Moreover, in order to express the diverted state of the air clearly, FIG. 5B shows, by use of a three-dimensional diagram, a state where the air is diverted into the flow of an air designated by the broken arrow and the flow of an air designated by the solid arrow in correspondence with FIG. 5A.

As is also obvious from these drawings, the air flowing to the air outlet 5 is diverted, by use of the diverting member 10 and the sidewall surface 8, into the air flowing toward the center of the air outlet 5 along the first side surface 10a of the diverting member 10 and an air flowing along the sidewall surface 8, with respect to the direction (the direction of an X-Y plane) orthogonal to the rotational center shaft 4c of the centrifugal fan 4.

Concurrently, the diverting member 10 diverts the air flowing to the air outlet 5 into an air flowing along the first side surface 10a of the diverting member 10 and the air flowing along the sidewall surface 8 while passing through the clearance located above the diverting member 10, with respect to the direction of the rotational center shaft of the centrifugal fan 4 (i.e., a direction Z).

Specifically, the air flowing to the air outlet 5 is diverted into the air flowing toward the air outlet 5 along the diverting member 10 and the air flowing toward the air outlet 5 along the sidewall surface 8 while passing through the clearance located above the diverting member 10. Hence, a deviation in the amount of air issued from the air outlet 5 can be diminished, and uniform discharge of an air over a wide range and an increase in the amount of blast can be materialized.

As mentioned above, the air is diverted into two directions; namely, the direction orthogonal to the rotational center shaft 4c of the centrifugal fan 4 (the direction of the X-Y plane) and the direction of the rotational center shaft of the centrifugal fan 4 (the direction Z). As a result, a deviation in the amount of air issued from the air outlet 5 can be diminished, and uniform discharge of an air over a wide range and an increase in the amount of blast can be materialized.

The second side surface 10b serving as the inclined surface of the diverting member 10 facing the sidewall surface 8 causes an air to flow above when the air flowing to the air outlet 5 passes by the side of the diverting member 10. As a result, the resistance to the airway induced by the diverting member 10 becomes smaller, and generation of an eddy current or air turbulence is inhibited, whereby the air flowing upwardly along the inclined second side surface 10b flows smoothly. Hence, a deviation in the amount of air issued from the air outlet 5 can be diminished more thoroughly, more uniform discharge of an air over a wide range and an increase in the amount of blast can be materialized.

Moreover, the third side surface 10c—whose width W becomes greater with a closer approach to the air outlet 5 and which is inclined with respect to the interior surface of the bottom of the fan frame 2b—is provided on the end face of the diverting member 10 that faces the air outlet 5. The air flowing to the air outlet 5 is diverted by means of the diverting member 10 and the sidewall surface 8. The air flow diverted into the direction orthogonal to the rotational center shaft 4c of the centrifugal fan 4 and the air flow diverted into the rotational center shaft 4c of the centrifugal fan 4 are mixed much as they approach the air outlet 5 along the inclined third side surface 10c. Thereby, the amount of air discharged from the air outlet 5 can be made uniform within the area of the air outlet 5. Consequently, a deviation in the amount of air discharged from the air outlet 5 is reduced further thoroughly, and uniform discharge of an air over a wide range and an increase in the amount of blast can be materialized.

Specifically, the air flowing to the air outlet 5 is diverted into the air flowing toward the air outlet 5 along the diverting member 10 and the air flowing toward the air outlet 5 along the sidewall surface 8 while passing through the clearance located above the diverting member 10. Hence, a deviation in the amount of air issued from the air outlet 5 can be diminished, and uniform discharge of an air over a wide range and an increase in the amount of blast can be materialized.

As mentioned above, the diverting member 10 is extended from the sidewall surface 8 in the vicinity of the air outlet 5 to the air outlet 5, to thus start splitting the air before the air flowing to the air outlet 5 begins to spread and to thus keep consecutively splitting the air until the air passes through the air outlet 5. When passing through the air outlet 5, the air is split thoroughly. Therefore, a deviation in the amount of air issued from the air outlet 5 can be diminished reliably, and uniform discharge of an air over a wide range and an increase in the amount of blast can be materialized.

Second Embodiment

Figure 6A:
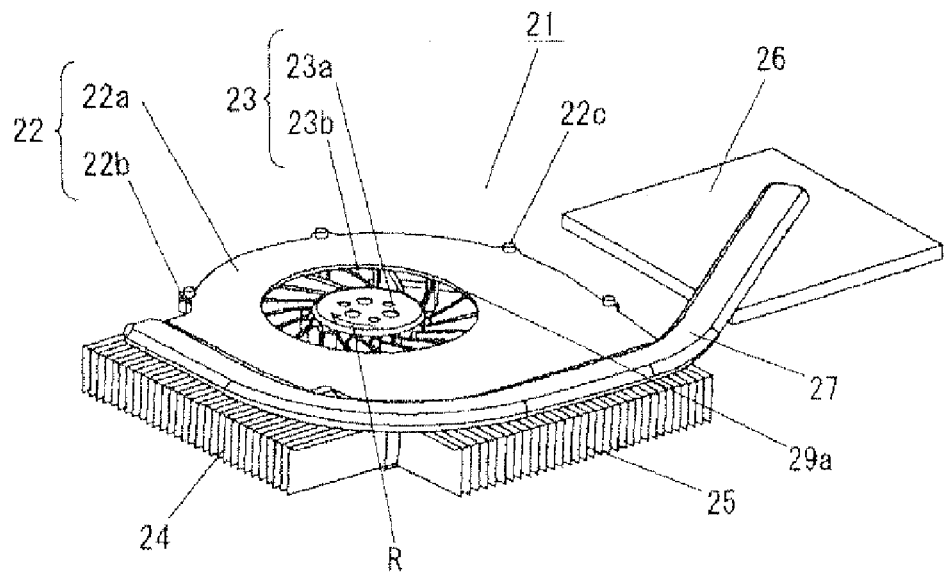
FIG. 6A is a perspective view of a centrifugal fan device of a second embodiment of the present invention.
Figure 6B:
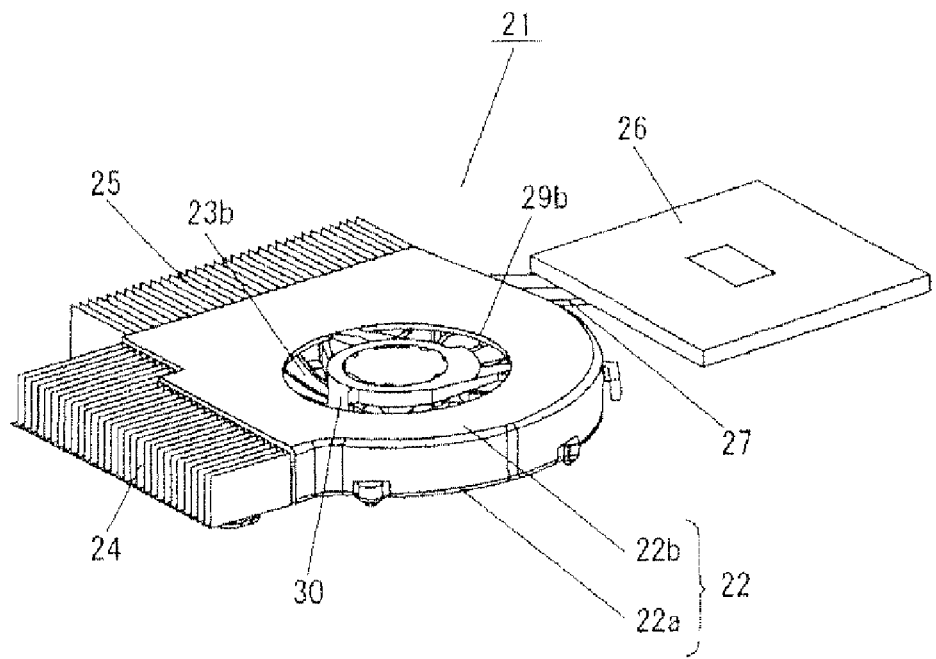
FIG. 6B is a perspective view of the centrifugal fan device acquired when the fan shown in FIG. 6A is inverted.
Figure 7:
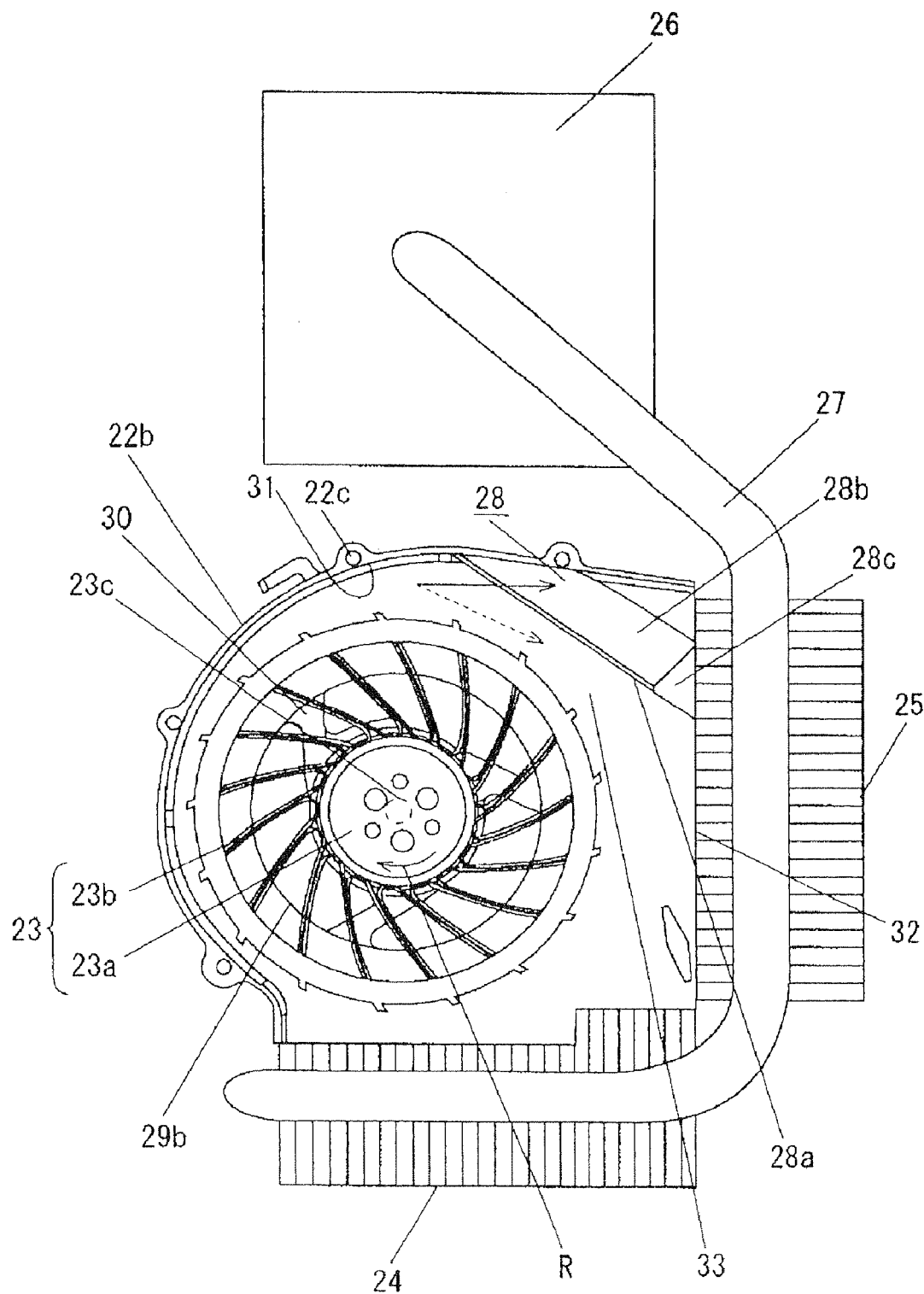
FIG. 7 is a plan view of the centrifugal fan device of the second embodiment of the present invention achieved when the fan cover is removed.
Figure 8A:
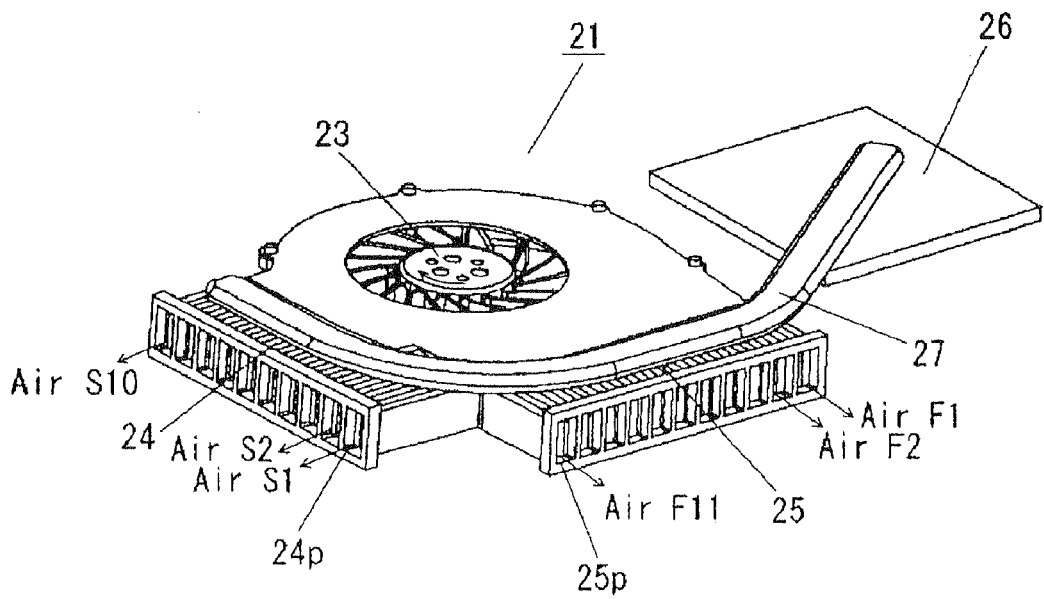
FIG. 8A is a perspective view of the centrifugal fan device acquired when a plate for use in measuring the distribution of wind speed distribution is attached to the centrifugal fan device.
Figure 8B:
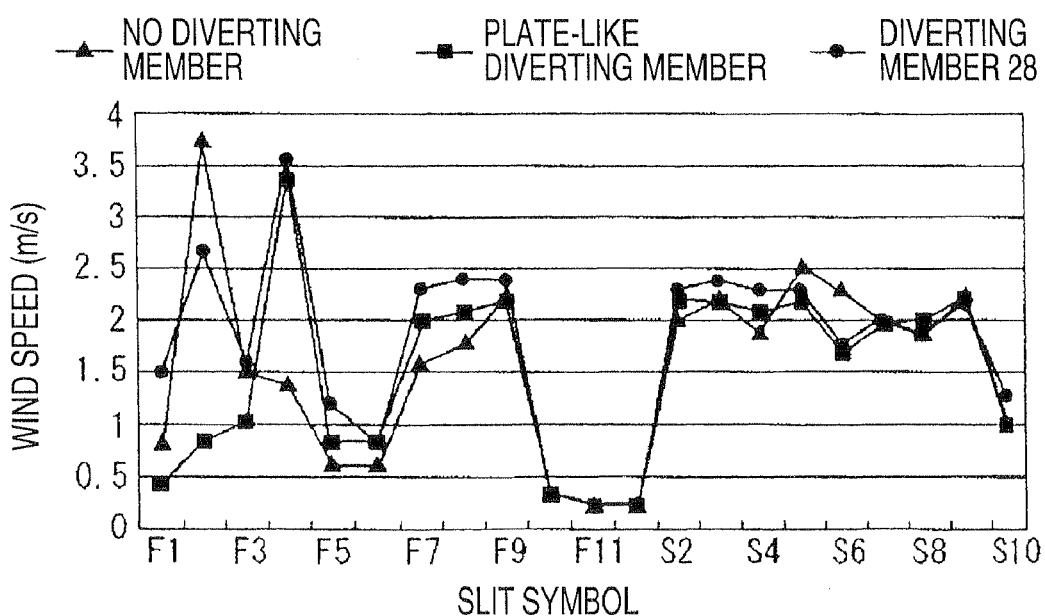
FIG. 8B is a graph of the distribution of wind speed distribution showing the diverting effect of a diverting member.

FIG. 6A is a perspective view of a centrifugal fan device of a second embodiment of the present invention; FIG. 6B is a perspective view of the centrifugal fan device acquired when the fan device shown in FIG. 6A is inverted; FIG. 7 is a plan view of the centrifugal fan device of the second embodiment of the present invention achieved when the fan cover is removed; FIG. 8A is a perspective view of the centrifugal fan device acquired when a plate for use in measuring the distribution of wind speed distribution is attached to the centrifugal fan device; and FIG. 8B is a graph of the distribution of wind speed distribution showing the diverting effect of a diverting member.

First, as shown in FIGS. 6A and 6B, a centrifugal fan device 21 comprises a thin, flat casing 22 made up of a fan cover 22a located in an upper portion of the fan and a fan frame 22b situated below the fan cover; a centrifugal fan 23 housed in the casing 22; a plurality of radiator fins 24 arranged continuous to one air outlet 32 (see FIG. 7) situated on the side of the casing 22; a plurality of radiator fins 25 arranged continuous to another air outlet (not shown) situated on the side of the casing 22; and a heat pipe 27 which is connected to upper ends of the respective radiator fins 24 and 25, receives heat from heating electronic components (not shown) by means of a heat-receiving section 26, and thermally transmits heat to the radiator fins 24 and 25.

The centrifugal fan 23, the casing 22, and the diverting member 28 provided in the casing 22 (see FIG. 7) are analogous in configuration to those counterparts in the centrifugal fan device 1 described in connection with the first embodiment (see FIG. 1), and hence explanations are provided while repeated explanations are partially omitted.

The fan cover 22a is formed into the shape of a plate by means of punching a metallic material such as aluminum, stainless steel, and the like, or by means of resin molding. An essentially-circular air intake 29a is formed in the essentially center of the fan cover for taking in an air from the outside.

The centrifugal fan 23 is disposed in the casing 22 so as to be housed and sandwiched between the fan cover 22a and the fan frame 22b. The centrifugal fan 23 is formed from a hub section 23a having a cylindrical outer peripheral surface and a plurality of blades 23b extending from the outer peripheral surface in an essentially-radial pattern and in a centrifugal direction. As a result of the blades 23b rotating around a rotational center shaft 23c acting as the center of rotation (see FIG. 7), the air is discharged in the centrifugal direction.

In the fan frame 22b, a bottom and a sidewall are formed integrally by means of resin molding or die-cast molding of an aluminum alloy. An air outlet 32 (see FIG. 7) is formed in the sidewall for issuing the air taken in the casing 22.

Specifically, the casing 22 is formed from the sidewall having the air outlet 32 for issuing the air sideways along the outer periphery of the centrifugal fan 23; and two parallel members; that is, a bottom of the fan cover 22a and a bottom of the fan frame 22b.

An essentially-cylindrical projection 22c which is fitted into a mount hole of the fan cover 22a and fixed by means of thermal welding, caulking, or the like, is provided at four positions on top of the sidewall of the fan frame 22b.

An air inlet 29b having essentially the same diameter as that of the previously-described air inlet 29a is formed in the bottom that is a lower portion of the fan frame 22b, and the air inlet 29b takes in an air from the outside.

Spokes 30 for rotationally retaining the centrifugal fan 23 are connected to the periphery of the air inlet 29b of the fan frame 22b so as to transverse the air inlet 29b.

When the centrifugal fan 23 rotates at high speed in the rotational direction designated by arrow R, an air is taken in through both the air inlet 29a formed in the center of the fan cover 22a so as to oppose an upper surface of the hub section 23a and the air inlet 29b placed in the center of the bottom of the fan frame 22b. Moreover, the direction of the air thus taken in is changed to the centrifugal direction of the blades 23b within the casing 22 by means of rotational movement of the plurality of blades 23b. Much of the air is delivered to the rotational direction of the centrifugal fan 23 designated by arrow R along the interior wall of the fan cover 22a and the interior wall of the fan frame 22b while colliding against the interior walls. The thus-delivered flows of air are finally discharged from the air outlet 32 (see FIG. 7).

The air flowing along the interior wall of the casing 22 is delivered to the radiator fins 24 and 25, and a uniform air is discharged from the air outlet 32 (see FIG. 7) over a wide range. Heat from heating electronic components (not shown) received by the heat-receiving section 26 is thermally transmitted to the radiator fins 24 and 25 by way of the previously-described heat pipe 27. Heat is exchanged with the air flowing through clearance between the radiator fins, whereby efficient heat radiation is performed.

A relationship between the state of diversion of the air performed by the diverting member 28 and the radiator fins 25 will now be described in more detail by reference to FIG. 7.

As is evident from the drawing, the diverting member 28 is formed integrally on an interior surface of the bottom of the fan frame 22b within an airway 33 located between the sidewall surface 31 of the fan frame 22b located laterally along the outer periphery of the centrifugal fan 23 and the air outlet 32. The diverting member 28 may also be provided separately from the bottom of the fan frame 2b.

The diverting member 28 extends from the sidewall surface 31 of the sidewall of the casing 22 to the air outlet 32, and the height of the diverting member 28 is lower than the height of the sidewall surface 8 of the sidewall of the casing 22.

The height of the diverting member 28 from an interior surface of the bottom of the fan frame 22b is set a low level so as to fall within a range from about 50% to 80% of the height of the sidewall surface 31 from an interior surface of the bottom of the fan frame 22b. The diverting member 28 broadly diverts the air flowing to the air outlet 32 along the sidewall surface 31 into a direction designated by a solid arrow and a direction designated by a broken arrow along two directions; namely, a direction orthogonal to the rotational center shaft 23c of the centrifugal fan 23 and the direction of the rotational center shaft 23c of the centrifugal fan 23. Since a deviation in the amount of air discharged from the air outlet 32 can be reduced, there is yielded an advantage of uniform discharge of an air over a wide range and an increase in the amount of blast. The radiator fins 25 efficiently performs heat exchange, and cooling performance can be enhanced.

Occurrence of an unusual noise, such as a wind noise, which would otherwise occur as a result of deviated winds being discharged through clearance among the radiator fins 25, can also be prevented. Hence, enhanced tranquility can be achieved.

A second side surface 28b which serves as the surface of the diverting member 28 facing the sidewall surface 31 is inclined with respect to the fan frame 22b such that an angle falls within a range from 25° to 65°. The air flowing to the air outlet 32 is caused to flow above while passing by the side of the diverting member 28, whereby the resistance to the airway imposed by the diverting member 28 becomes small and occurrence of an eddy current or air turbulence is prevented. The air smoothly flows along the inclined second side surface 28b, and hence a deviation in the amount of air discharged from the air outlet 32 can be reduced further more reliably. There is yielded an advantage of uniform discharge of an air over a wide range and an increase in the amount of blast. The radiator fins 25 efficiently performs heat exchange, and cooling performance can be enhanced.

Moreover, a third side surface 28c—whose width becomes greater with a closer approach to the air outlet 32 and which is inclined with respect to the interior surface of the bottom of the fan frame 22b—is provided on the end face of the diverting member 28 that faces the air outlet 32. The air flowing to the air outlet 32 is diverted by means of the diverting member 28 and the sidewall surface 31. The flows of air diverted into two directions; namely, the direction orthogonal to the rotational center shaft 23c of the centrifugal fan 23 and the direction of the rotational center shaft 23c of the centrifugal fan 23, are mixed much as they approach the air outlet 32 along the inclined third surface 28c. Thereby, the amount of air discharged from the air outlet 32 can be made uniform within the area of the air outlet 32. Consequently, since a deviation in the amount of air discharged from the air outlet 32 is reduced further thoroughly, there is yielded an advantage of uniform discharge of an air over a wide range and an increase in the amount of blast. The radiator fins 25 efficiently performs heat exchange, and cooling performance can be enhanced.

Specifically, the air flowing to the air outlet 32 is diverted into an air flowing toward the air outlet 32 along the diverting member 28 and another air flowing toward the air outlet 5 along the side wall surface 31 after having passed through clearance located at a position above the diverting member 28. Therefore, a deviation in the amount of air discharged from the air outlet 32 is reduced, and there is yielded an advantage of uniform discharge of an air over a wide range and an increase in the amount of blast. The radiator fins 25 efficiently performs heat exchange, and cooling performance can be enhanced.

As mentioned above, as a result of the diverting member 28 being extended from the sidewall surface 31 in the neighborhood of the air outlet 32 to the air outlet 32, the air that is to flow to the air outlet 32 starts being diverted before spreading, and diversion of the air is continuously performed until the air passes through the air outlet 32. When passing through the air outlet 32, the air is diverted thoroughly. Accordingly, a deviation in the amount of air discharged from the air outlet 32 is reduced further thoroughly, and there is yielded an advantage of uniform discharge of an air over a wide range and an increase in the amount of blast. The radiator fins 25 efficiently performs heat exchange, and cooling performance can be enhanced.

FIG. 8A shows that plates 24p and 25p for use in measuring the distribution of wind speed distribution are attached to air outlets of the radiator fins 24 and 25 of the centrifugal fan device 21.

Here, slit symbols are assigned, from upstream, to respective slits in the measurement plate 25p in sequence of F1, F2, F3, . . . , F11. Moreover, slit symbols are assigned, from upstream, to respective slits in the measurement plate 24p in sequence of S1, S2, S3, . . . , S10. Thus, the horizontal axis of a graph of wind speed distribution, which will be described later, can correspond to the slit symbols.

FIG. 8B is a graph of wind speed distribution showing a result of measurement of wind speed acquired at respective slits while the plates 24p and 25p for measuring wind speed distribution, such as those shown in FIG. 8A, are attached; namely, a diverting effect of the diverting member.

In this graph, on the precondition that the centrifugal fan 23, the casing 22, and the radiator fins 24 and 25 are the same as those of the centrifugal fans compared with each other and that the number of rotations was adjusted such that a fan noise assumes a value of 32 dBA, the diverting member 28 and a diverting member assuming the shape of a simple plate were compared with each other.

Results of measurement show that a wide margin does not exist in results of wind speed distribution measured at the slit symbols S1, S2, S3, . . . S10 at the air outlet sides of the radiator fins 24. In contrast, a noticeable difference is admitted to exist among results of wind speed distribution measured at the slits symbols F1, F2, F3, . . . , F11 situated at the air outlet sides of the radiator fins 25.

In particular, when there is no diverting member, a locally-deviated air was blown to the slit symbol F2. When the mere plate-like diverting member is provided, a locally-deviated air was blown to the slit symbol F4. An unusual noise, such as a wind noise, occurred when deviated winds were blown through clearance among the radiator fins 25 as a result of discharge of deviated winds. Difficulty was encountered in increasing the number of rotations. In contrast, when the diverting member 28, such as that described in connection with the second embodiment of the present invention, was provided, the winds were diverted into the direction of the slit symbol F2 and the direction of the slit symbol F4. The noise, such as a wind noise, which arises when the wind flows through the clearance among the radiator fins 25, is reduced correspondingly.

When identical fan noise values were compared with each other, an increase in the number of rotations becomes possible. Therefore, when the diverting member 28 was provided, an increase in wind speed over the entire slit symbols F1, F2, F3, . . . , F11 was admitted as is evident from the graph.

Consequently, the amount of wind discharged from both the radiator fins 24 and 25 is ascertained to have increased about 14% when compared with the case where no diverting member was provided. Further, the amount of wind is ascertained to have increased by about 18% when compared with the case where the mere plate-like diverting member was provided.

As above, a centrifugal fan device, such as the centrifugal fan device 21 of the second embodiment of the present invention, can reduce a deviation in the amount of air discharged from the air outlet 32. There is yielded an advantage of uniform discharge of an air over a wide range and an increase in the amount of blast. The radiator fins 25 efficiently performs heat exchange, and cooling performance can be enhanced.

Further, an unusual noise, such as a wind noise, which would otherwise occur as a result of deviated winds being discharged through clearance among the radiator fins 25, can also be prevented. Hence, enhanced tranquility can be achieved.

Third Embodiment

Figure 9A:
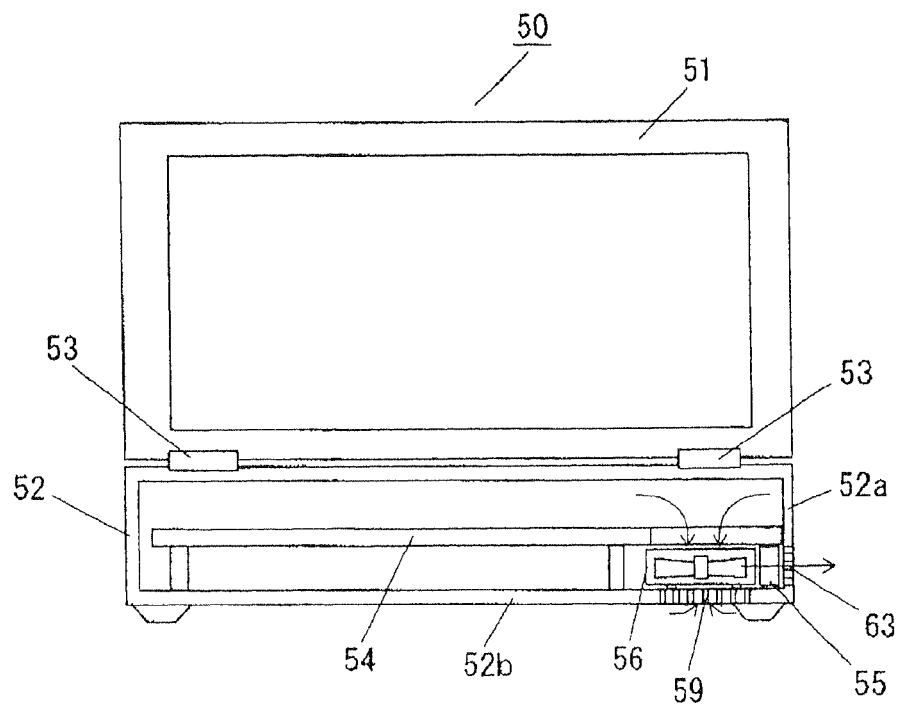
FIG. 9A is a view showing the inside of a housing of an electronic device according to a third embodiment of the present invention.
Figure 9B:
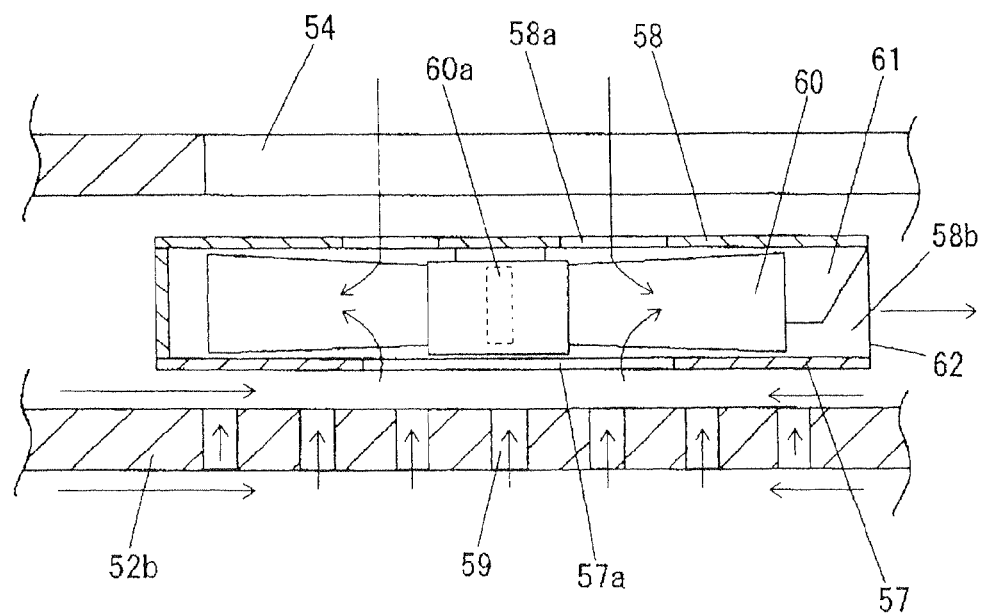
FIG. 9B is a cross-sectional view showing the primary section of the electronic device shown in FIG. 9A.
Figure 10A:
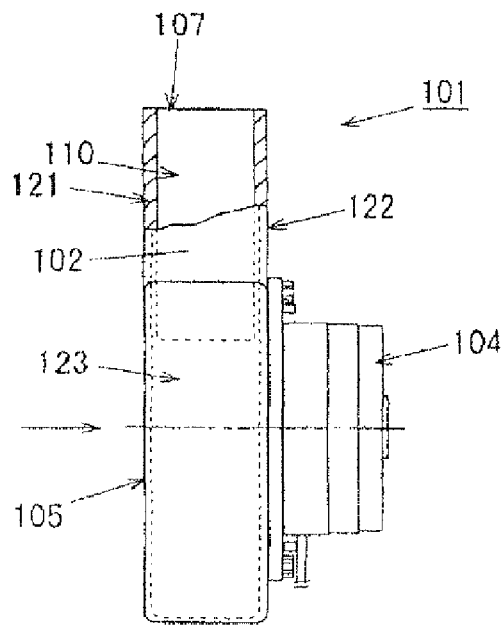
FIG. 10A is a side view showing the inside of a casing of a centrifugal fan device of the related art.
Figure 10B:
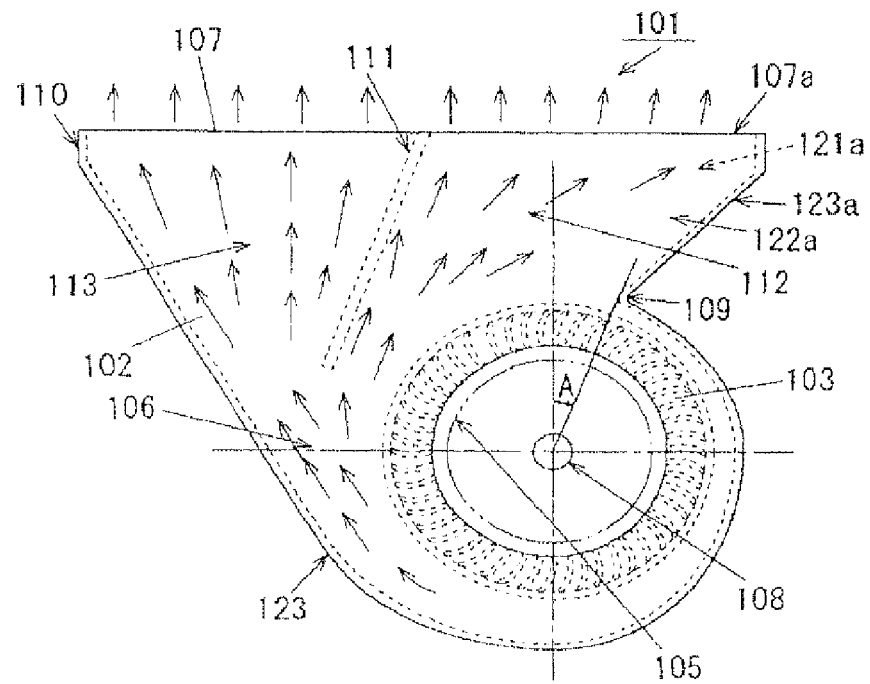
FIG. 10B is a partial cutaway front view of the casing of the fan device of the related art.

FIG. 9A is a view showing the inside of a housing of an electronic device according to a third embodiment of the present invention, and FIG. 9B is a cross-sectional view showing the primary section of the electronic device shown in FIG. 9A.

An electronic device 50 is a notebook PC, in which a reclosable liquid-crystal display device 51 is supported pivotably by hinge mechanisms 53 provided at both ends of a main unit 52 having an operation section.

In these drawings, a heating electronic component (not shown) to be cooled is mounted on a lower surface of a circuit board 54 placed in the housing of the main unit 52 in the electronic equipment 50. The drawings show that a plurality of radiator fins 55 thermally connected to the heating electronic component are provided on a housing side surface 52a of the main unit 52.

A centrifugal fan device 56 is identical in configuration with that described in connection with the first embodiment. The centrifugal fan device 56 is mounted on a lower side of a circuit board 54 so as to adjoin to the radiator fins 55. A fan cover 57 comes to a lower position, and a fan frame 58 comes to an upper position.

An air located on a lower side of the main unit 52 is taken in through an inlet 57a of the fan cover 57 while passing through a plurality of vent holes 59 formed in a bottom surface 52b of the main unit 52. Concurrently, an air located in the main unit 52 is taken in through an air inlet 58a of the fan frame 58. The direction of the air is changed to a centrifugal direction of a centrifugal fan 60 within the casing formed from the fan cover 57 and the fan frame 58, by means of rotation movement of the centrifugal fan 60. Much of the air is delivered to a direction identical with the rotating direction of the centrifugal fan 60 along an interior wall of the fan cover 57 and an interior wall of the fan frame 58 while colliding against the interior walls.

As described in connection with the first embodiment, the height of a diverting member 61 is set so as to become lower than the height of a sidewall surface 58b of the fan frame 58. The diverting member 61 diverts an air—which flows to the air outlet 62 along the sidewall surface 58a—into two directions: namely, a direction orthogonal to a rotational center shaft 60a of the centrifugal fan 60 and a direction of the rotational center shaft 60a of the centrifugal fan 60. As a result, a deviation in the amount of air issued from the air outlet 62 can be diminished reliably, and uniform discharge of an air over a wide range and an increase in the amount of blast can be materialized.

As above, in relation to the air issued from the air outlet 62, there is yielded an advantage of uniform discharge of an air over a wide range and an increase in the amount of blast. The radiator fins 55 efficiently performs heat exchange, and cooling performance can be enhanced.

Further, an unusual noise, such as a wind noise, which would otherwise occur as a result of deviated winds being discharged through clearance among the radiator fins 55, can also be prevented. Hence, enhanced tranquility can be achieved.

The air having passed through the clearance among the plurality of radiator fins 55 while exchanging heat with the radiator fins 55 is finally discharged outside after having passed through the vent holes 63 formed in the housing side surface 52a of the main unit 52.

Specifically, as a result of inclusion of the centrifugal fan device 56 such as that mentioned above, heat radiation performance of the radiator fins 55 with respect to a heating element is enhanced. Measures against heat generation, which is required when a heating electronic component, such as an MPU or a CPU which operates at a higher clock frequency, is mounted in an electronic device, become simpler. Therefore, higher performance of the electronic device 50 can be realized.

In terms of the dimensions, the number of, materials, shapes, and relative layouts of constituent elements, the scope of the present invention is not construed to be limited unless otherwise specified in the descriptions of the embodiment. The above descriptions are mere explanations of one embodiment, and the embodiment is susceptible to various modifications. For instance, the height and size of the diverting member, the number of side surfaces of the diverting member, and the like, may also be changed, as appropriate, according to the direction of flow of an air desired to be controlled. The diverting member may also be provided on the fan cover rather than on the fan frame. The outer shape of the casing may also assume an essentially-circular shape, an essentially-triangular shape, or other polygonal shapes rather than an essential square or an essential parallelogram. The air inlet may also be provided in only one of the fan cover and the fan frame, or the air outlet may also be provided in only one direction or in the number of three or more.

Even in connection with the configuration of the casing, the casing may also have, rather than being formed simply from a fan cover and a fan frame, a heat-receiving section which is provided in a portion of the fan frame and which makes a thermal connection with a heating electronic component, as described in connection with the second embodiment. Alternatively, a heat sink exhibiting a heat radiation characteristic may also be provided integrally by means of die-cast molding, press molding, or other molding. Moreover, the casing may also be additionally equipped with a heat transfer member, such as a heat pipe, a thermal conductive sheet, or the like, for efficiently transporting heat between the casing and the heat sink.

Moreover, the essential requirement for the centrifugal fan is to have a plurality of blades and to blow an air in the centrifugal direction by means of rotation of the blades of the fan. For instance, the centrifugal fan may be of a shape in which blades are formed only around an outer periphery portion of the fan as in; e.g., a sirrocco fan. All you have to do is to interpret a rotational center shaft employed in such a case corresponding to a center shaft of a virtual outer peripheral circle formed from an outer peripheral portion of the blades.

Fourth Embodiment

Figure 11:
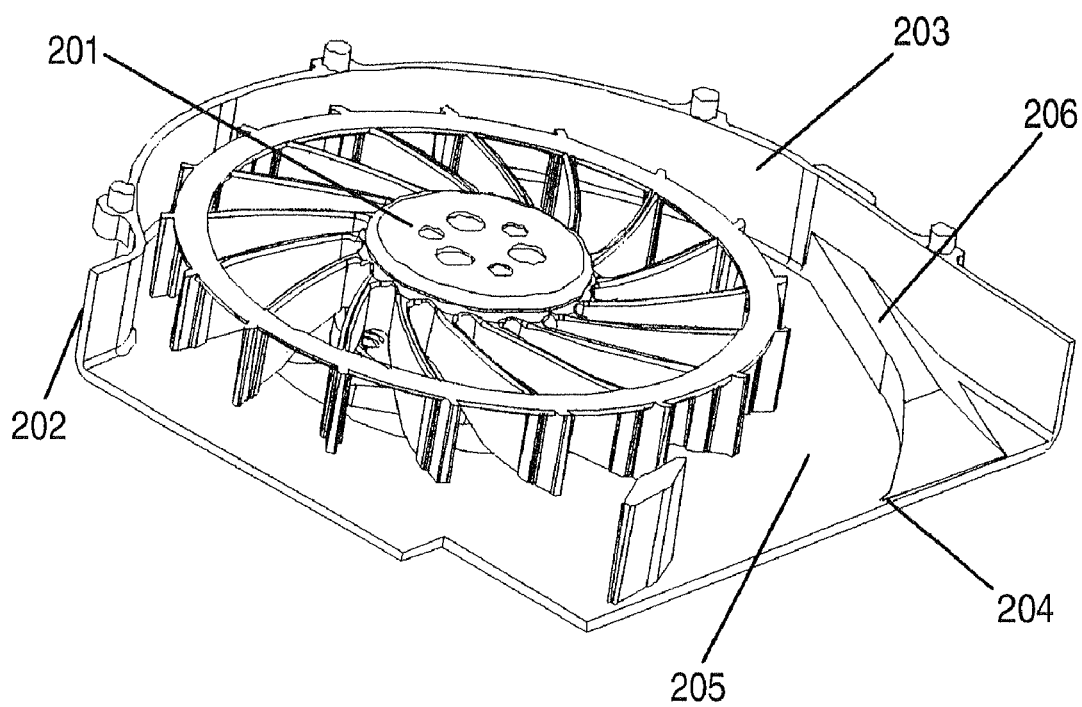
FIG. 11 is a perspective view of a centrifugal fan device of a fourth embodiment of the present invention acquired when a fan cover is removed from the centrifugal fan device.
Figure 12A:
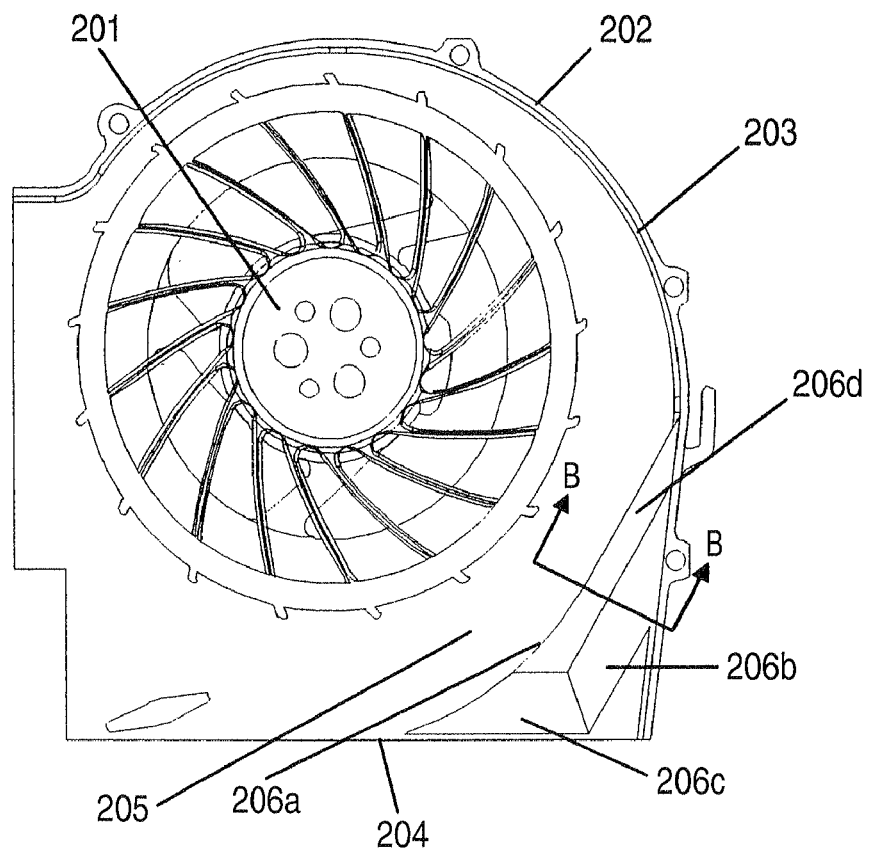
FIG. 12A is a plan view of the centrifugal fan device of the fourth embodiment of the present invention acquired when the fan cover is removed from the centrifugal fan device.
Figure 12B:
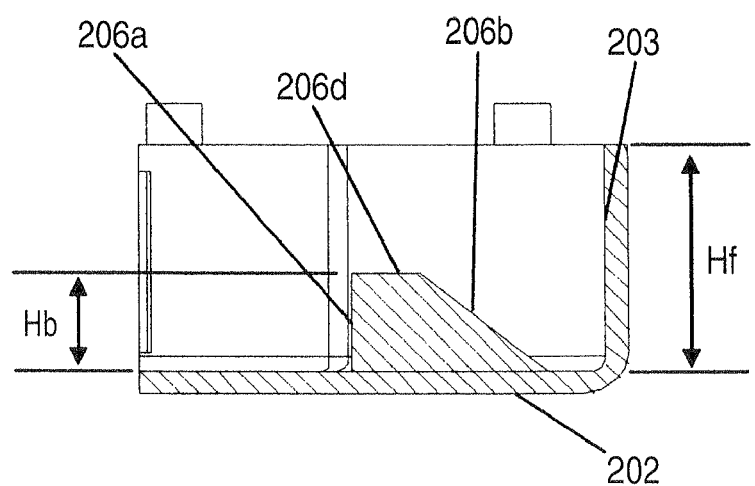
FIG. 12B is a cross-sectional view taken along line B-B shown in FIG. 12A.
Figure 13:
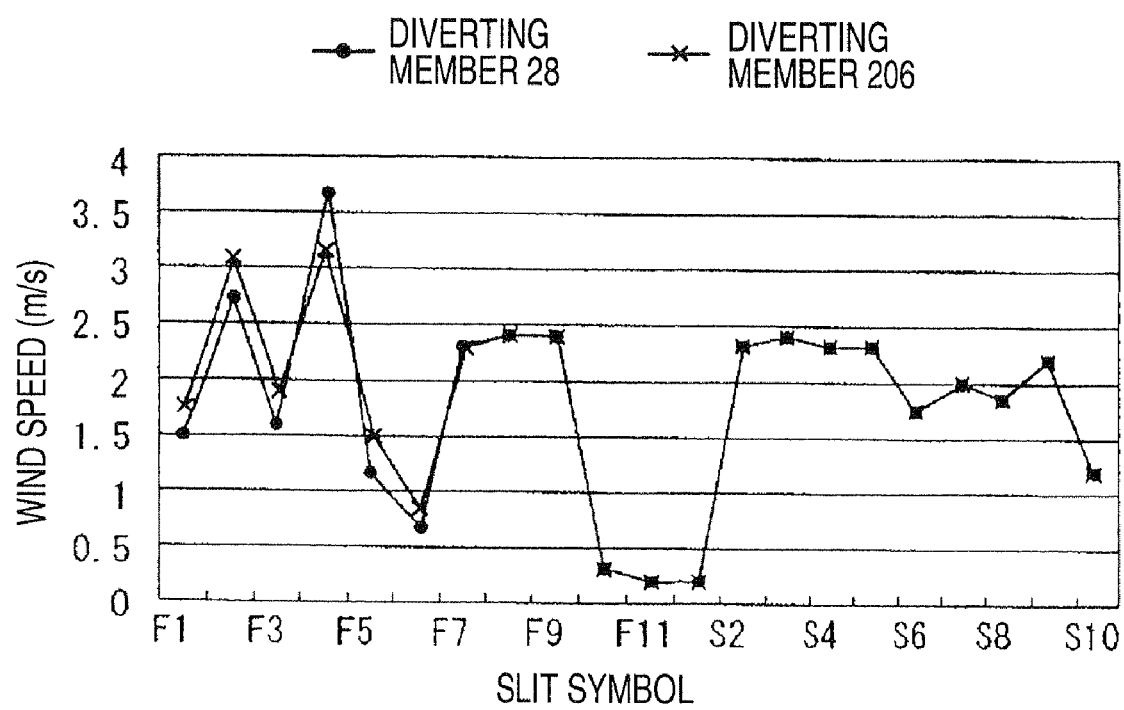
FIG. 13 is a graph of wind speed distribution showing the diverting action of a diverting member of the fourth embodiment of the present invention.

FIG. 11 is a perspective view of a centrifugal fan device of a fourth embodiment of the present invention acquired when a fan cover is removed from the centrifugal fan device; FIG. 12A is a plan view of the centrifugal fan device of the fourth embodiment of the present invention acquired when the fan cover is removed from the centrifugal fan device; FIG. 12B is a cross-sectional view taken along line B-B shown in FIG. 12A; and FIG. 13 is a graph of wind speed distribution showing the diverting action of a diverting member of the fourth embodiment of the present invention.

The present embodiment is directed toward a change made to the shape of the diverting member in connection with the first and second embodiments. The shape of the diverting member is described below.

Firsts as shown in FIG. 11, a diverting member 206 is formed integrally on an interior surface of a bottom of the fan frame within an airway 205 located between an air outlet 204 and a sidewall surface 203 of a fan frame 202 situated sideways along the outer periphery of a centrifugal fan 201. The diverting member 206 may also be provided separately from the bottom of the fan frame 202.

The height of the diverting member 206 is made lower than the height of the sidewall surface of the fan frame 202. As a result of the height of the diverting member 206 being made low, the air flowing to the air outlet 204 is diverted to the direction of rotational center of the centrifugal fan 201. Moreover, the air diverted to apposition above the diverting member 206 flows to the air outlet 204 along the sidewall surface 203, whereas the air diverted along the diverting member 206 flows to the air outlet 204 along a sidewall surface of the diverting member 206 facing the centrifugal fan 201.

As a result, the air diverted to the position above the diverting member 206 and the air diverted along the diverting member 206 are diverted to a direction orthogonal to the rotational center shaft of the centrifugal fan 201. At this time, the sidewall surface of the diverting member 206 facing the centrifugal fan 201 is provided in the form of an arc such that the flowing direction of the air stemming from rotation of the centrifugal fan 201 is first linearly changed toward the air outlet 204; and such that the air flowing along the sidewall surface of the diverting member 206 subsequently moves away from the air flowing along the sidewall surface 203 in the vicinity of the air outlet 204.

As shown in FIG. 12A, this diverting member 206 comprises a first surface 206a provided at a position facing the centrifugal fan 201; a second surface 206b provided at a position facing the sidewall surface 203; a third surface 206c provided at a position facing the air outlet 204; and a fourth surface 206d acting also as an upper surface of the diverting member 206. The first surface 206a has a linear portion for changing the direction of the flow of the air stemming from rotation of the centrifugal fan 201 toward the air outlet 204; and a curved portion which is provided in an arc shape such that the air flowing along the sidewall surface of the diverting member 206 moves away from the air flowing along the sidewall surface 203 in the vicinity of the air outlet 204. The second surface 206b has an inclined surface for lowering the air diverted to the position above the diverting member 206 toward the sidewall surface 203. The third surface 206c is inclined with respect to the fan frame 202 so as to enable the air diverted to the position above the diverting member 206 and the air diverted along the diverting member 206 to go back and forth in the neighborhood of the air outlet. The fourth surface 206d is a plane parallel to the bottom surface of the fan frame 202 provided on the diverting member 206.

As shown in FIG. 12B, the first surface 206a is provided essentially perpendicular to the fan frame 202, whereas the second surface is inclined with respect to the bottom surface of the fan frame 202. The height Hb of the diverting member 206 from the interior surface of the fan frame 202 is set so as to become lower than the height Hf of the sidewall surface 204 from the interior surface of the fan frame 202.

Operation of the centrifugal fan device of the present embodiment having such as configuration will now be described.

First, when the centrifugal fan 201 rotates, the flow of an air develops in the fan frame 202. This flow of the air is diverted in the direction of the rotational center shaft of the centrifugal fan 201 by means of the diverting member 206. Moreover, the air diverted to the position above the diverting member 206 spreads from the fourth surface 206d to the second surface 206b, and flows to the air outlet 204 along the sidewall surface 203. Meanwhile, the air diverted along the diverting member 206 flows to the air outlet 204 along the first surface 206a of the diverting member 206. As a result, the air diverted to the position above the diverting member 206 and the air diverted along the diverting member 206 are diverted to the direction orthogonal to the rotational center shaft of the centrifugal fan 201. Moreover, with closer approach to the neighborhood of the air outlet 204, the air diverted along the diverting member 206 moves away, in the neighborhood of the air outlet 204, from the air flowing along the sidewall surface 203 by means of the curved portion of the sidewall surface 206a. Thereby, an interval between the air flowing along the sidewall surface 203 in the vicinity of the air outlet 204 and the air diverted along the diverting member 206 is broadened at the air outlet 204. Meanwhile, the third surface 206c enables the air diverted to the position above the diverting member 206 and the air diverted along the diverting member 206 to go back and forth.

FIG. 13 is a graph of wind speed distribution showing a result of measurement of wind speed, which is analogous to that achieved in the second embodiment, performed by means of providing the centrifugal fan device of the embodiment with radiator fins. From FIG. 13, it is seen that, when compared with the diverting member 28 of the second embodiment, the diverting member 206 of the present embodiment is enhanced and made more uniform as indicated by slit symbols F2 and F4 in terms of a ratio of air quantity.

This application is based upon and claims the benefit of priorities of Japanese Patent Application No. 2006-198970 filed on Jul. 21, 2006, No. 2007-118691 filed on Apr. 27, 2007 and No. 2007-144797 filed on May 31, 2007, the contents of which are incorporated herein by reference in its entirety.

What is claimed is:
1. A centrifugal fan device comprising:
a centrifugal fan that has a plurality of blades, the centrifugal fan blowing an air in a centrifugal direction by rotation of the plurality of the blades;

a casing that houses the centrifugal fan, the casing includes a sidewall, the sidewall having an air outlet along an outer periphery of the centrifugal fan, the casing having a first cover and a second cover, the first cover and the second cover being provided parallel to the centrifugal fan, the first cover and the second cover covering the centrifugal fan, each of the first cover and the second cover having an air inlet for taking the air in the centrifugal fan; and a diverting member that stands upright on an interior surface of one of the first cover and the second cover, the diverting member extending from the sidewall to the air outlet, and a height of the diverting member being lower than a height of a sidewall surface of the sidewall, wherein:

the diverting member has a first side surface and a second side surface, the first side surface of the diverting member facing the blades and being substantially perpendicular to the interior surface of one of the first cover and the second cover, and the second side surface of the diverting member facing the sidewall and being inclined with respect to the interior surface of one of the first cover and the second cover, and the diverting member has an end face, the end face of the diverting member facing the air outlet and being inclined with respect to the interior surface of one of the first cover and the second cover.

2. The centrifugal fan device according to claim 1 further comprising radiator fins that are continuous to the air outlet of the casing.

3. A centrifugal fan device comprising:

a centrifugal fan that has a plurality of blades, the centrifugal fan blowing an air in a centrifugal direction by rotation of the plurality of the blades;

a casing that houses the centrifugal fan, the casing includes a sidewall, the side wall having an air outlet along an outer periphery of the centrifugal fan, the casing having a first cover and a second cover, the first cover and the second cover being provided parallel to the centrifugal fan, the first cover and the second cover covering the centrifugal fan, each of the first cover and the second cover having an air inlet for taking the air in the centrifugal fan; and a diverting member that stands upright on an interior surface of one of the first cover and the second cover, and a height of the diverting member being lower than a height of a sidewall surface of the sidewall, wherein the diverting member diverts, the air flowing to the air outlet, into a centrifugal fan side and a side wall side of the diverting member, and the diverting member diverts, the air flowing to the air outlet, into a first cover side and a second cover side of the diverting member, wherein:

wherein the diverting member has an end face, the end face of the diverting member facing the air outlet and being inclined with respect to the interior surface of one of the first cover and the second cover, and the end face of the diverting member mixes the air diverted into the centrifugal fan side and the side wall side of the diverting member with the air diverted into the first cover side and the second cover side of the diverting member, when the air approaches the air outlet along the inclined surface of the end face; and the diverting member has a first side surface and a second side surface, the first side surface of the diverting member facing the blades and being substantially perpendicular to the interior surface of one of the first cover and the second cover, the second side surface of the diverting member facing the sidewall and being inclined with respect to the interior surface of one of the first cover and the second cover, and the air flowing toward the first side surface flows over the diverting member and flows down along the second side surface of the diverting member.

4. An electronic device having the centrifugal fan device as claimed in claim 1.

5. An electronic device having the centrifugal fan device as claimed in claim 3.

6. A centrifugal fan device comprising:

a centrifugal fan that has a plurality of blades, the centrifugal fan blowing an air in a centrifugal direction by rotation of the plurality of the blades;

a casing that houses the centrifugal fan, the casing includes a sidewall, the sidewall having an air outlet along an outer periphery of the centrifugal fan, the casing having a first cover and a second cover, the first cover and the second cover being provided parallel to the centrifugal fan, the first cover and the second cover covering the centrifugal fan, one of the first cover and the second cover having an air inlet for taking the air in the centrifugal fan; and a diverting member that stands upright on an interior surface of one of the first cover and the second cover, the diverting member extending from the sidewall to the air outlet, and a height of the diverting member being lower than a height of a sidewall surface of the sidewall, wherein:

the diverting member has a first side surface and a second side surface, the first side surface of the diverting member facing the blades and being substantially perpendicular to the interior surface of one of the first cover and the second cover, and the second side surface of the diverting member facing the side wall and being inclined with respect to the interior surface of one of the first cover and the second cover, and the diverting member has an end face, the end face of the diverting member facing the air outlet and being inclined with respect to the interior surface of one of the first cover and the second cover.

* * * * *